United States Patent [19]

Watanabe et al.

[11] Patent Number: 5,935,043
[45] Date of Patent: Aug. 10, 1999

[54] LOCKUP CONTROL APPARATUS OF TORQUE CONVERTER

[75] Inventors: Akira Watanabe, Kanagawa; Kazutaka Adachi, Yokohama; Shigeru Ishii; Tatsuo Wakahara, both of Kanagawa, all of Japan

[73] Assignee: Nissan Motor Co., Ltd, Yokohama, Japan

[21] Appl. No.: 09/065,427

[22] Filed: Apr. 24, 1998

[30] Foreign Application Priority Data

Apr. 25, 1997 [JP] Japan .................................. 9-109227

[51] Int. Cl.⁶ .................................................. F16H 61/14
[52] U.S. Cl. .............................................. 477/169; 701/67
[58] Field of Search ................................ 477/168, 169, 477/176; 701/67

[56] References Cited

U.S. PATENT DOCUMENTS

| | | | |
|---|---|---|---|
| 5,616,099 | 4/1997 | Sakai | 477/169 |
| 5,620,394 | 4/1997 | Iizuka | 477/168 |
| 5,667,458 | 9/1997 | Narita et al. | 477/169 |
| 5,787,379 | 7/1998 | Ochiai et al. | 701/68 |

FOREIGN PATENT DOCUMENTS 8-21526   1/1996   Japan .

*Primary Examiner*—Dirk Wright
*Attorney, Agent, or Firm*—Foley & Lardner

[57] ABSTRACT

A lockup control apparatus of a torque converter for a vehicle comprises a coast condition detecting section for detecting coast running of a vehicle, a lockup clutch slip detecting section for detecting a target slip generated between the input and output elements of the torque converter and a slip start capacity storing section, and a coast lockup control section for detecting a lockup capacity. The slip start capacity storing section detects a slip start capacity by once decreasing the lockup capacity to the sum of a last stored slip start capacity and a preset capacity and stores the slip start capacity while updating it. During the coast running a coast lockup control section controls the lockup capacity at a minimum lockup engagement capacity which is the sum of the newest slip start capacity and a predetermined capacity.

12 Claims, 13 Drawing Sheets

LOCKUP CONTROL APPARATUS OF TORQUE CONVERTER

BACKGROUND OF THE INVENTION

The present invention relates to improvements in a lockup control apparatus of a torque converter having a lockup mechanism for establishing a direct connection between input and output elements of the torque converter.

Normally, an automatic transmission is provided with a torque converter for increasing torque and absorbing torque fluctuation. Such a torque converter is generally of a lockup type arranged to directly connect input and output elements of the torque converter under a predetermined condition so as to improve the energy consumption by the improvements of the power transfer efficiency. For example, the lockup of the torque converter is executed in a running condition where it is not necessary to ensure torque increasing function and torque fluctuation absorbing function.

In order to improve the energy consumption by further improving the transfer efficiency of the torque converter, it is preferable to set the torque converter into the lockup engagement condition when the vehicle is put in a coast running where a throttle opening is set at 0/8 as shown in FIG. 14. That is, it is preferable to expand a lockup range under the coast running to a lower load operation and a lower vehicle-speed operation as possible. However, when the vehicle is quickly decelerated by the operation of a brake apparatus during the coast running while being traveling on a low-friction lead, wheels of the vehicle are suddenly stopped. In such sudden stop situation, it is difficult to execute the release of the lockup engagement of the torque converter before the sudden wheel stop so called wheel lock. This invites a trouble such as an engine stall.

Japanese Patent Provisional Publication No. 8-21526 has proposed a control apparatus for solving such a trouble while keeping energy saving. The control apparatus is arranged to calculate a minimum lockup engagement capacity, which is the smallest value where no slip is generated between input and output elements of a torque converter, on the basis of a detection value and estimated value of a reverse drive torque. When the vehicle is put in the coast running, this control apparatus controls the lockup engagement force so as to maintain the lockup capacity at the minimum lockup engagement capacity.

However, the characteristic of the friction coefficient $\mu$ of the lockup clutch against the slip is generally fluctuated by each individual due to the difference of a facing, temperature and aging. Since this conventional control apparatus is arranged to control the lockup capacity at a predetermined minimum lockup engagement capacity, if the characteristic of the friction coefficient $\mu$ of the facing of the lockup clutch is dispersed among individuals, it is possible that the slip between the input and output elements of the torque converter will be generated even if the lockup capacity is controlled at the predetermined minimum lockup engagement capacity.

SUMMARY OF THE INVENTION

It is an object of the present invention to provide an improved lockup control apparatus which suitably controls the minimum lockup engagement capacity by determining the minimum lockup engagement capacity according to a slip start capacity. This enables suitable setting of the minimum lockup engagement capacity even if the friction coefficient of the facing of the lockup clutch is dispersed among individuals.

A lockup control apparatus according to the present invention is for a torque converter of a vehicle and comprises a coast running detector and a lockup capacity detector, a slip detector and a controller. The coast running detector detects coast running of the vehicle equipped with the torque converter. The lockup capacity detector detects a lockup capacity according to which a lockup engagement condition of torque converter is controlled. The slip detector detects a magnitude of slip between input and output elements of the torque converter. The controller determines a slip start capacity at which a target slip is generated between the input of the torque converter on the basis of the detected lockup capacity and the detected slip when the coast running is detected. The controller calculates a minimum lockup engagement capacity on the basis of the slip start capacity under the coast running. The controller controls the lockup capacity at the minimum lockup engagement capacity.

DETAILED DESCRIPTION OF THE INVENTION

Figure 1:
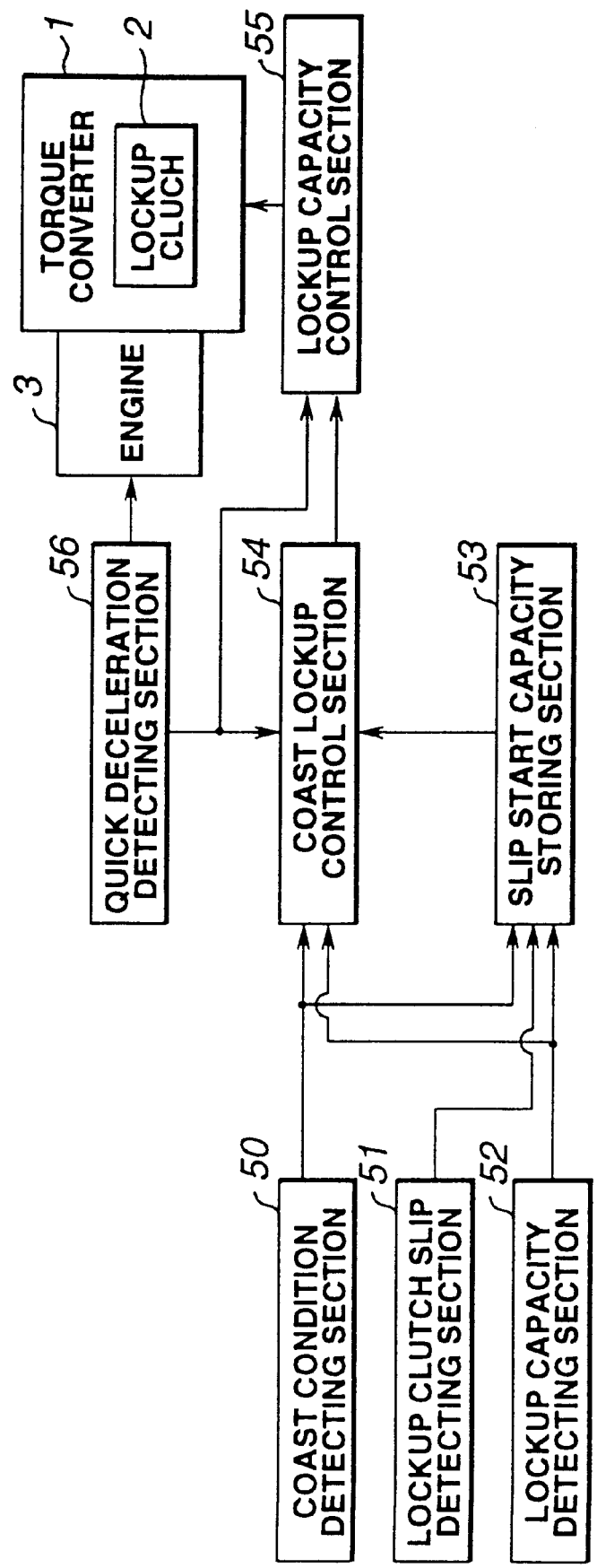
FIG. 1 is a schematic block diagram which shows a first embodiment of a lockup control apparatus of a torque converter in accordance with the present invention.

Referring to FIGS. 1 to 6, there is shown a first embodiment of a lockup control apparatus of a torque converter 1 in accordance with the present invention.

The torque converter 1 has a lockup clutch 2 which sets the torque converter 2 at a lockup condition by controlling a lockup capacity within a lockup range. The lockup range is an oration range in which the torque increasing function and the torque fluctuation absorbing function of the torque converter 1 are not required. In the other condition, that is, in a converter range, the lockup clutch 2 sets the torque converter 1 at a converter condition in which the toque converter 1 is put in a lockup disengaged condition.

Basically, the lockup control apparatus according to the present invention comprises a coast condition detecting section 50, a lockup clutch slip detecting section 51, a lockup capacity detecting section 52, a slip start capacity storing section 53, and a coast lockup control section 54. The coast condition detecting section 50 is arranged to detect coast running of a vehicle. The lockup clutch slip detecting section 51 is arranged to detect a slight and target slip generated between the input and output elements of the torque converter 1. The lockup capacity detecting section 52 is arranged to detect the lockup capacity. The slip start capacity storing section 53 is arranged to detect the slip start capacity when the target slip is generated. The slip start capacity storing section 53 updates and stores the slip start capacity. The coast lockup control section 54 controls the lockup capacity at a minimum lockup engagement capacity during the coast running. The minimum lockup engagement capacity is a minimum engagement capacity by which the slip between the input and output elements of the torque converter 1 is prevented. Further, a lockup capacity control section 55 controls the lockup capacity according to a command value from the coast lockup control section 54.

The coast lockup control section 54 once decreases the lockup capacity at an engagement capacity which is the sum of a last (previous) slip start capacity and a preset capacity. The coast lockup control section 54 detects a new slip start capacity from this engagement capacity by means of the coast condition detecting section 50 and the slip start capacity storing section 53. The minimum lockup engagement capacity is obtained by increasing the slip start capacity by a predetermined capacity. Then, the minimum lockup engagement, which is a minimum value at which the slip between the input and output elements of the torque converter 1 is not generated, is executed.

The first embodiment of the lockup control apparatus according to the present invention further comprises a quick deceleration detecting section 56 for detecting whether quick deceleration is applied to the vehicle or not. When this quick deceleration is detected, the lockup control apparatus according to the present invention executes one of an operation for releasing the engagement of the lockup clutch 2 and an operation of the engine stall preventing control for the engine 3.

Figure 2:
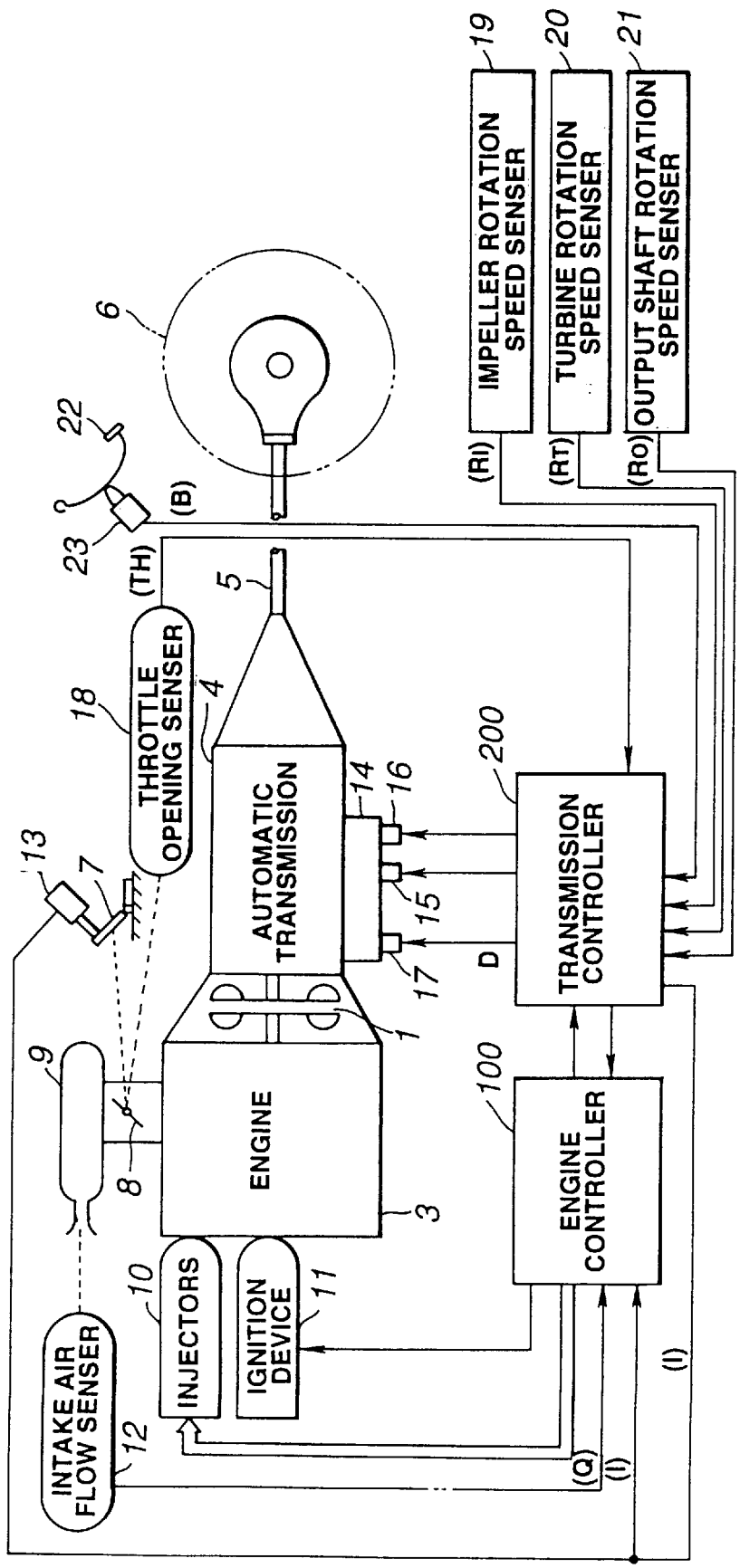
FIG. 2 is a schematic view which shows a power train provided with the lockup control apparatus of FIG. 1 according to the present invention.

As shown in FIG. 2, the lockup control apparatus according to the present invention is installed to a power train. The torque converter 1 executes power transmission between the input and output elements thereof through torque hydraulic filled therein. The torque converter 1 has the torque increasing (multiplying) function and the torque fluctuation absorbing function. The input element of the torque converter 1 is connected to the engine 3 functioning as a motor, and the output element of the torque converter 1 is connected to an automatic transmission 4. The automatic transmission 4 receives drive power of the engine 3 through the torque converter 1 and changes the input rotation of the drive power by means of the selected gear ratio thereof. The automatic transmission 4 outputs the changed drive power to wheels 6 through an output shaft 5 to drive the vehicle.

The engine 3 comprises a throttle control value 8 which changes its opening according to an depression degree of an acceleration pedal 7 depressed by a driver. The engine 3 aspirates air through an air clearer 9 while changing the amount of the air according to the opening of the throttle control valve 8 and the rotation speed of the engine 3. The engine 3 comprises a set of injectors 10 and an ignition device 11 which are respectively controlled by an engine controller 100. The engine controller 100 is connected to an intake air flow sensor 12 for detecting an intake air amount Q of the engine 3 and a coast switch 13 which is turned on when the acceleration pedal 7 is released (a foot of a driver is released from the acceleration pedal 7) and outputs a signal I to the engine controller 100. Each injector 10 is installed to each cylinder of the engine 3.

The engine controller 100 controls the set of injectors 10 on the basis of the above-mentioned input information so as to inject a predetermined amount of fuel from each injector 10 to each cylinder according to the operating condition of the engine 3. For example, the engine controller 100 implements a fuel-cut for stopping the supply of fuel to the engine 3 during the coast running. Further, the engine controller 100 controls the ignition device 11 on the basis of the input information so as to ignite each ignition plug of each engine cylinder at predetermined intervals. Therefore, the engine 3 is normally operated and is fuel-cut during the coast running of the vehicle. Further, the engine controller 100 implements a fuel recovery by which a predetermined amount of fuel is re-injected from each of the injectors 10 to each cylinder when the engine rotation speed becomes smaller than or equal to a predetermined value. By this fuel recovery, the engine stall due to the locking of the wheels 6 is prevented.

The rotational power from the engine 3 is inputted to the automatic transmission 4 through the torque converter 1. The automatic transmission 4 determines the select shift speed by the combination of turn-on and turn-off of shift solenoids 15 and 16 in the control valve 14.

The torque converter 1 comprises the lockup clutch 2 which is controlled by a lockup solenoid 17 in the control valve 14 by means of the duty-ratio control. The lockup clutch 2 establishes the lockup condition of the torque converter 1 within the lockup range in which the torque increasing function and the torque fluctuation absorbing function are not required. In the other range, the lockup clutch 2 puts the torque converter 1 in the converter condition by releasing the lockup engagement.

A transmission controller 200 controls the turn-on and turn-off of the shift solenoids 15 and 16 and the drive duty D of the lockup solenoid 17. The transmission controller 200 is connected to the coast switch 13, the throttle opening sensor 18, an impeller rotation speed sensor 19, a turbine rotation speed sensor 20, an output shaft rotation speed sensor 21 and a brake switch 23.

The coast switch 13 outputs the signal I to the transmission controller 200. The throttle opening sensor 18 outputs a signal representative of the throttle opening TH of the engine 3 to the transmission controller 200. The impeller rotation speed sensor 19 outputs a signal $R_I$ representative of an input rotation speed $N_I$ of the torque converter 1 to the transmission controller 200. The turbine rotation speed sensor 20 outputs a signal $R_T$ representative of an output rotation speed $N_T$ of the torque converter 1 to the transmission controller 200. The output shaft rotation speed sensor 21 outputs a signal $R_O$ representative of the rotation speed $N_O$ of the output shaft 5 to the transmission controller 200. The brake switch 23 outputs a signal B representative of the depression of a brake pedal 22.

The transmission controller 200 implements a shift control on the basis of the above-mentioned input information in a manner of a well-known calculations and procedures. That is, during the shift control the transmission controller 200 selects an optimum gear ratio fitted with a present vehicle running condition according to the throttle opening TH, the output rotation speed $N_O$ and the vehicle speed V. For example, the proper gear ratio is selected from the data table by means of the look-up method and implements the shifting to the selected gear ratio by turning on and off the shift solenoids 15 and 16 so as to select the optimum gear ratio. The transmission controller 200 decides from the input information as to whether or not the vehicle is put in the lockup range. When it is decided that the vehicle is put in the lockup range, the torque converter 1 is set in the lockup condition. When it is decided that the vehicle is not put in the lockup range, the torque converter 1 is set in the converter condition.

The engine controller 100 and the transmission controller 200 are bidirectionally interconnected. For example, the fuel-cut and fuel-recovery for the engine 3 are executed according to the engagement and disengagement of the lockup clutch 2.

Figure 3:
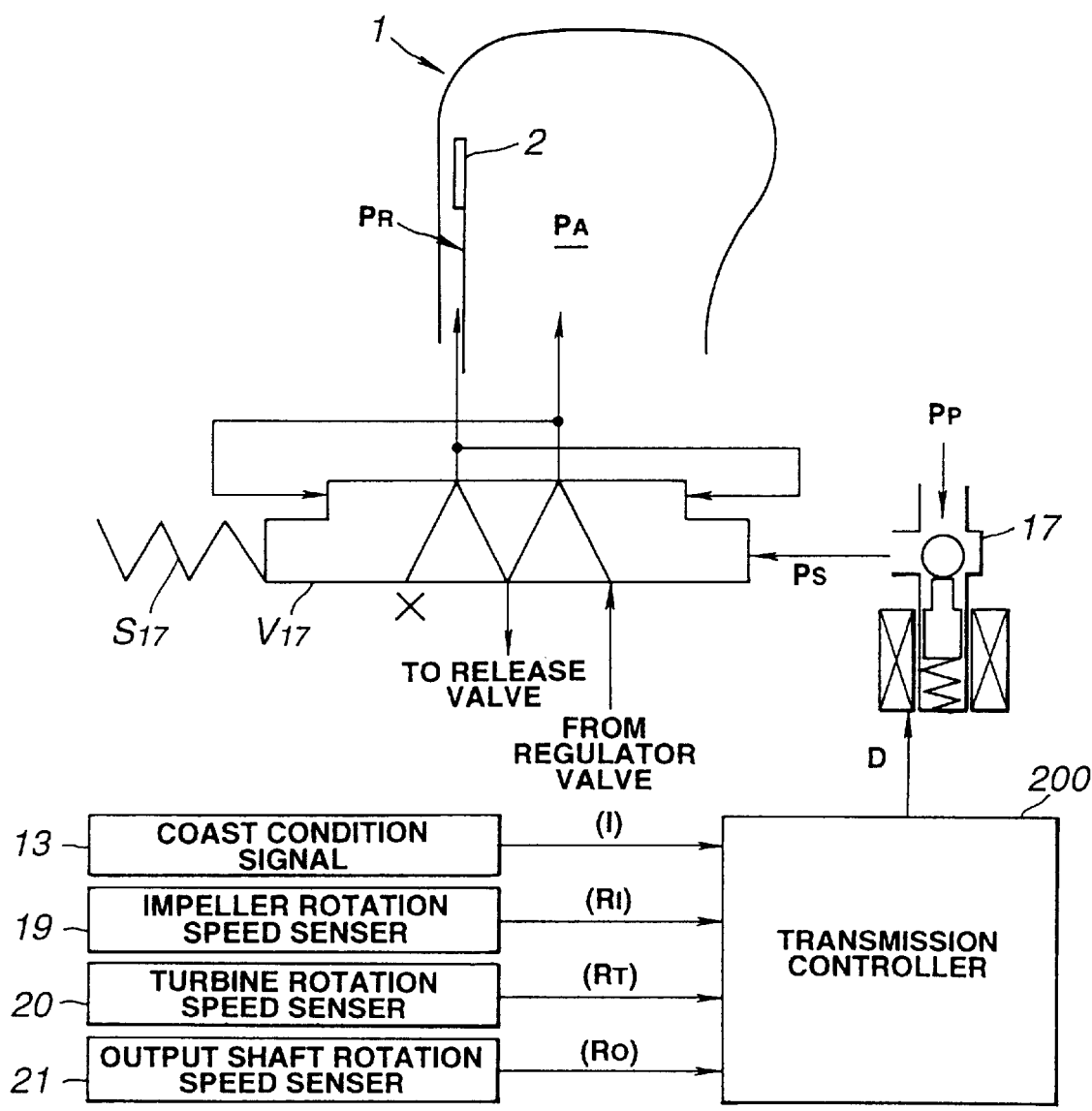
FIG. 3 is a schematic view which shows the lockup control apparatus of FIG. 1 according to the present invention.

FIG. 3 shows a construction of the lockup control apparatus according to the present invention. As shown in FIG. 3, the lockup clutch 2 installed in the torque converter 1 is arranged to directly connect the input and output elements of the torque converter 1 and to disengage the direct connection therebetween by controlling the lockup capacity. In this first embodiment, the lockup capacity corresponds to a lockup pressure difference (L/U pressure difference) which is a difference ($P_A$-$P_R$) between a torque-converter apply pressure $P_A$ applied to one side of the lockup clutch 2 and a torque-converter release pressure $P_R$ applied to the other side of the lockup clutch 2. As shown in FIG. 3, the torque-converter apply pressure $P_A$ is applied to a right hand side of FIG. 3 so as to establish the engagement of the lockup clutch 2. On the other hand, the torque-converter release pressure $P_R$ is applied to a left hand side of FIG. 3 so as to disengage the engaged lockup clutch 2.

When the lockup capacity is small, that is, when the torque-converter apply pressure $P_A$ is smaller than the torque-converter release pressure $P_R$ so as to decrease the L/U pressure difference, the torque converter 1 is set in the converter condition so as to release the direct connection (lockup engagement) between the input and output elements of the torque converter 1 through the lockup clutch 2. When the lockup capacity is large, that is, when the torque-converter apply pressure $P_A$ is larger than the torque-converter release pressure $P_R$ so as to increase the L/U pressure difference, the torque converter 1 is set in the lockup condition so as to directly connect the input and output elements of the torque converter 1. The L/U pressure difference is controlled by switching a lockup control valve $V_{17}$ of the control valve 14. In the lockup control valve $V_{17}$, the torque-converter apply pressure $P_A$ and a pushing force of a spring $S_{17}$ are applied to an end of a spool of the lockup control valve $V_{17}$ in the same direction. The torque-converter release pressure $P_R$ and a signal pressure $P_S$ from the lockup solenoid 17 are applied to the other end of the spool of the lockup control valve $V_{17}$ in the same direction but the direction thereof is against the torque-converter apply pressure $P_A$ and the pushing force of a spring $S_{17}$.

The signal pressure $P_S$ from the lockup solenoid 17 is generated from a pump pressure $P_P$ as a source pressure and controlled by the drive duty D of the transmission controller 200. The transmission controller 200 receives the signal I from the coast switch 13 which signal corresponds to the coast condition signal indicative of the coast running, and the signals $R_I$, $R_T$, and $R_O$. The signal $R_I$ outputted from the impeller rotation speed sensor 19 may be replaced with the engine rotation speed detected by an engine rotation speed sensor.

Figure 4:
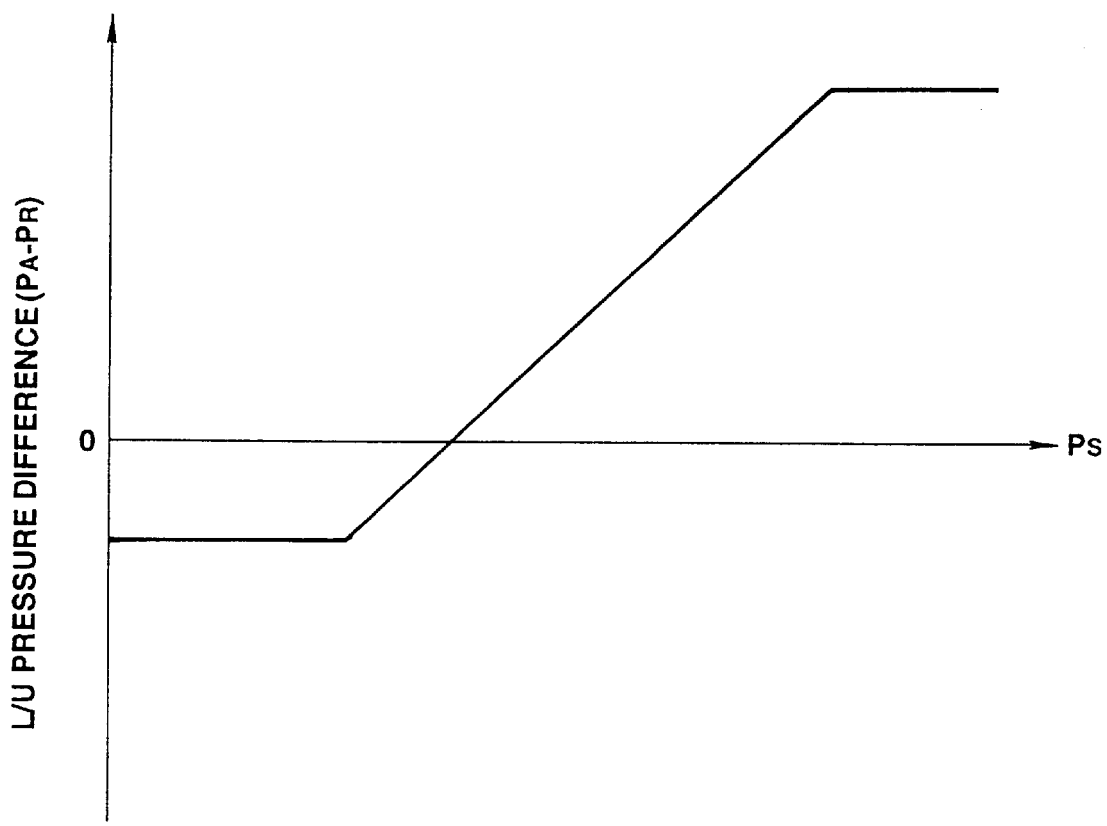
FIG. 4 is a graph showing a relationship between a L/U pressure difference and a signal pressure Ps.

The relationship between the signal pressure $P_S$ and the L/U pressure difference is shown in FIG. 4. When the signal pressure $P_S$ is small, the lockup engagement of the torque converter 1 is released. When the signal pressure is large, the lockup engagement is established.

The manner of operation of the lockup control apparatus according to the present invention will be discussed hereinafter.

Figure 5:
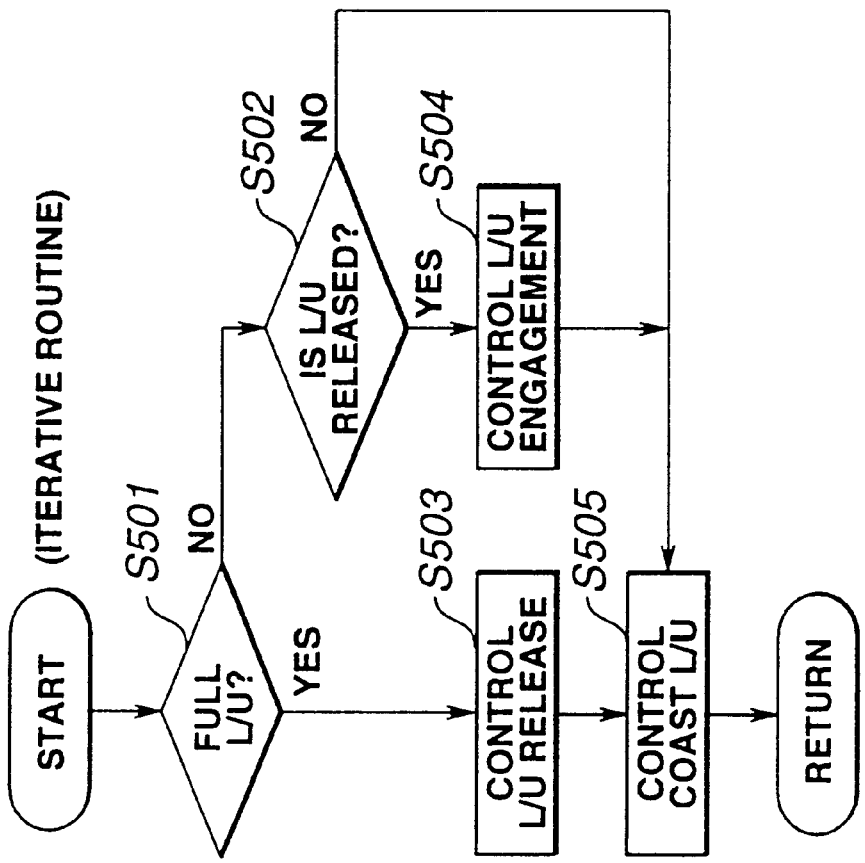
FIG. 5 is a flowchart showing a lockup control executed by the lockup control apparatus according to the present invention.
Figure 6:
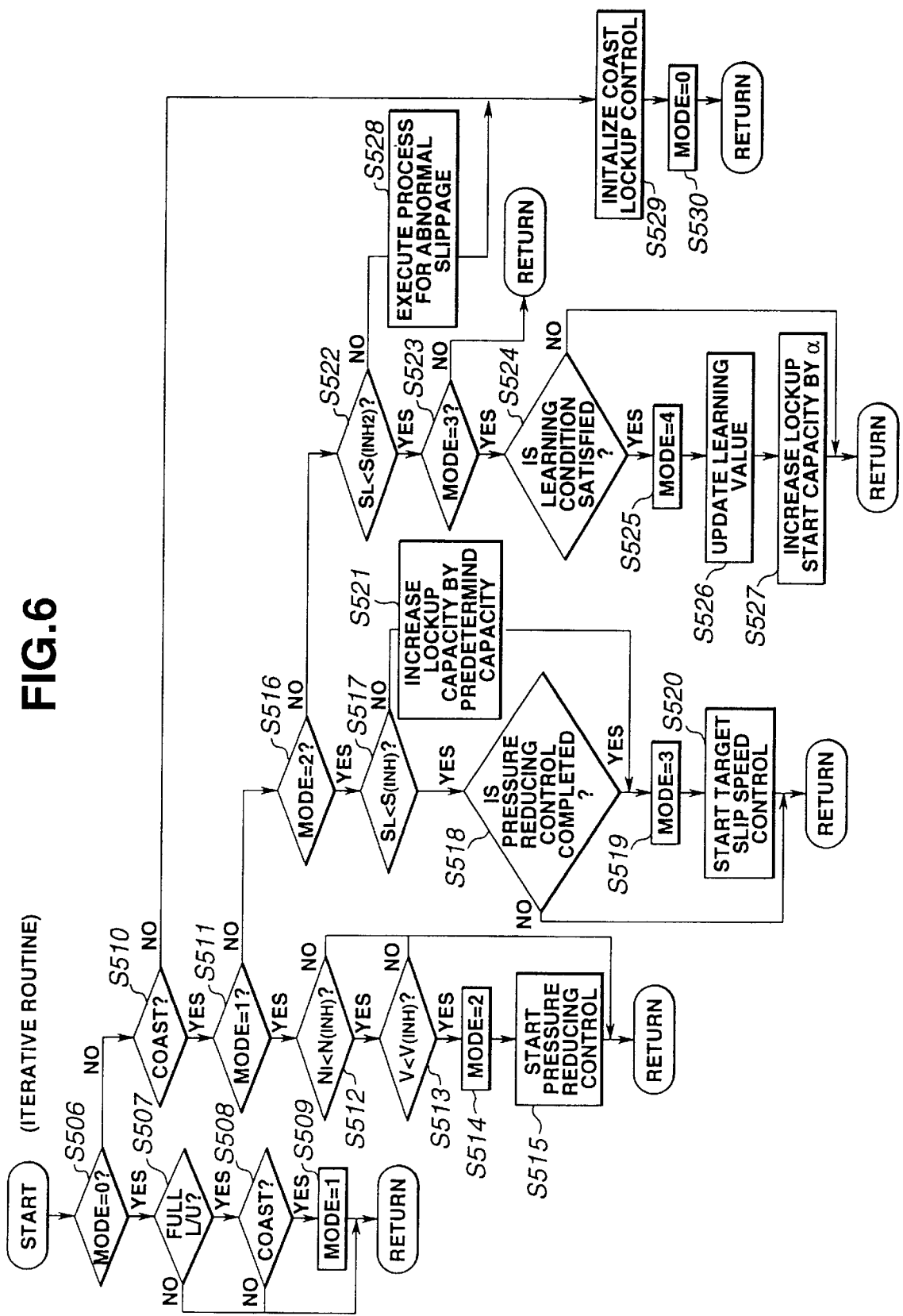
FIG. 6 is a flowchart showing a coast lockup control executed by the lockup control apparatus of the first embodiment according to the present invention.

The lockup control apparatus controls the minimum lockup capacity on basis of flowcharts of FIGS. 5 and 6. In these flowcharts, L/U denotes a lockup, and coast denotes a coast running of the vehicle. In the flowchart of FIG. 5, steps S501 to S504 represent a normal lockup control as conventionally executed, and a step S505 represents a coast lockup control (coast L/U control). The flowchart of FIG. 5 is periodically or non-periodically executed at extremely short intervals.

At the step S501, the transmission controller 200 decides whether or not the lockup clutch 2 is set in a full lockup condition where no slip is generated between the input and output elements of the torque converter 1. When it is decided at the step S501 that the lockup clutch 2 is put in the full lockup condition, the routine proceeds to the step S503 wherein the transmission controller 200 executes the L/U control on the basis of the vehicle speed V, the throttle opening TH, hydraulic fluid temperature and the like. More particularly, at the step S503, the lockup engagement is maintained in the lockup range, and the lockup engagement is released in the converter range. When it is decided at the step S501 that the lockup clutch 2 is not set in the full lockup condition, the routine proceeds to the step S502 wherein the transmission controller 200 decides whether the lockup engagement is released or not. When it is decided at the step S502 that the torque converter 1 is put in the lockup released condition, the routine proceeds to the step S504. When it is decided at the step S502 that the torque converter 1 is put in the lockup condition, the routine proceeds to the step S505.

At the step S504, the transmission controller 200 decides whether the lockup condition is satisfied or not, as is similar to that at the step S503. Further, when the lockup condition is satisfied, the torque converter 1 is set in the lockup condition by operating the lockup clutch 2.

Following to the step S502 or S503 or S504, the routine proceeds to the step S505 wherein the transmission controller 200 executes the coast lockup control shown in FIG. 6 upon taking account of the running condition of the vehicle. The flowchart of FIG. 6 is also periodically or non-periodically executed at extremely short intervals.

In the flowchart of FIG. 6, at a step S506, the transmission controller 200 checks a present operation mode of the vehicle including the torque converter 1. The operation mode is represented by "MODE" and takes five states MODE=0 to 4 as follows.

"MODE=0" represents that the torque converter 1 is set in the full lockup condition and that the vehicle is not put in the coast running condition.

"MODE=1" represents that the torque converter 1 is set in the full lockup condition and that the vehicle is put in the coast running condition. That is, it represents that the coast lockup control is now being executed.

"MODE=2" represents that the pressure reducing control of the lockup capacity is executed during the coast running.

"MODE=3" represents that the pressure reducing control is accomplished and that the transmission controller 200 is now detecting the slip start capacity at which a slight target slip is generated.

"MODE=4" represents that the minimum lockup engagement is executed by increasing the newly detected slip start capacity by the predetermined capacity.

More particularly, at the step S506 the transmission controller 200 decides whether or not the operation mode is MODE=0. When it is decided at the step S506 that the operation mode is MODE=0, the routine proceeds to a step S507 wherein the transmission controller 200 decides whether or not the full lockup engagement is established. When the decision at the step S507 is YES, the routine proceeds to a step S508. When the decision at the step S507 is NO, the routine jumps to a return step from which the routine returns to the start step of this program.

At the step S508, the transmission controller 200 decides whether or not the coast running of the vehicle is executed. When the decision at the step S508 is YES, the routine proceeds to a step S509. When the decision at the step S508 is NO, the routine jumps to the return step.

At the step S509, the transmission controller 200 sets the operation mode at MODE=1. Then, the routine proceeds to the return step.

On the other hand, when it is decided at the step S506 that the operation mode is not MODE=0, the routine proceeds to a step S510.

At the step S510, the transmission controller 200 decides whether the coast running of the vehicle is executed or not. When the decision at the step S510 is YES, the routine proceeds to a step S511. When the decision at the step S510 is NO, the routine jumps to a step S529 wherein the coast lockup control is initialized. Following to the implement of the step S529, the routine proceeds to a step S530 wherein the operation mode is set at MODE=0. Then, the routine returns to the start step.

At the step S511, the transmission controller 200 decides whether or not the operation mode is MODE=1. When the decision at the step S511 is YES, the routine proceeds to a step S512. When the decision at the step S511 is NO, the routine jumps to a step S516.

At the step S512, the transmission controller 200 decides whether or not the impeller rotation speed $N_I$ is smaller than a predetermined rotation speed $N_{(INH)}$. When the decision at the step S512 is YES, the routine proceeds to a step S513. When the decision at the step S512 is NO, the routine jumps to a return step from which the routine returns to the start step of this program.

At the step S513, the transmission controller 200 decides whether or not the vehicle speed V is smaller than a predetermined vehicle speed $V_{(INH)}$. When the decision at the step S513 is YES, the routine proceeds to a step S514. When the decision at the step S513 is NO, the routine jumps to the return step.

At the step S514, the transmission controller 200 sets the operation mode at MODE=2.

Following to the step S514, the routine proceeds to a step S515 wherein the transmission controller 200 starts the pressure reducing control for reducing the present lockup capacity $P_{L/U}$ to an engagement capacity $P_{L/O}$ which is the sum of the last stored slip start capacity and the preset capacity ΔP. This pressure reducing control is executed in order to once decrease the present lockup capacity $P_{L/U}$ at a lockup capacity which is generally similar to that of the minimum lockup condition. The engagement capacity $P_{L/O}$ is defined as a value of the lockup capacity by which it is possible to execute the fuel recovery control to the engine 3 in case of the large decrease of the engine rotation speed due to the abnormal stop of the lockup clutch 2 and not to degrade the responsibility of the lockup clutch 2. In this first embodiment, the preset capacity ΔP is set such that the engagement capacity $P_{L/O}$ obtained by the pressure reducing control becomes the last minimum lockup engagement capacity.

Although the pressure reducing control of the lockup capacity $P_{L/U}$ is executed at the step S515 in order to control the minimum lockup engagement capacity, it is possible that friction coefficient of a facing of the lockup clutch 2 will be dispersed due to differences of individuality, temperature and aging. Therefore, when the lockup capacity $P_{L/U}$ during the coast running is decreased to the engagement capacity $P_{L/O}$ which is the sum of the last slip start capacity and the preset capacity ΔP, it is possible that some of the lockup clutches 2 will release the lockup engagement due to the dispersion of the facing.

After the implement of the step S515, the routine returns to the start step while the operation mode is set at MODE=2. Therefore, after the execution of the steps S506, S510, S511 and S516, at a step S517 in the next routine, the transmission controller 200 checks the abnormal slip generated during the pressure reducing control of the lockup capacity $P_{L/U}$ to the engagement capacity $P_{L/O}$ by detecting the slip rotation speed which is larger than the preset value.

At the step S517, the transmission controller 200 decides whether or not the slip rotation speed $S_L$ between the input and output elements of the torque converter 1 is smaller than a predetermined slip rotation speed $S_{(INH)}$. That is, at the step S517, it is decided whether the lockup clutch 2 is put in the normal slip condition or the abnormal slip condition. When the decision at the step S517 is YES, that is, when the lockup clutch 2 is put in the normal slip condition, the routine proceeds to a step S518. When the decision at the step S517 is NO, that is, when the lockup clutch 2 is put in the abnormal slip condition, the routine proceeds to a step S521.

At the step S518, the transmission controller 200 decides whether the pressure reducing control is completed or not. When the decision at the step S518 is YES, the routine proceeds to a step S519. When the decision at the step S518 is NO, the routine jumps to a return step through which the routine returns to the start step.

Following to the NO decision at the step S517, the routine proceeds to the step S521 wherein the transmission controller 200 increases the lockup capacity $P_{L/U}$ by a predetermined capacity $P_{(UP1)}$. Then, the routine proceeds to the step S519.

At the step S519, the transmission controller 200 sets the operation mode at MODE=3.

At a step S520, the transmission controller 200 controls the engagement capacity $P_{L/O}$ decreased at the step S515 in order to detect a new slip start capacity $P_{L/S(new)}$ and starts the target slip speed control in order to obtain a target slip (small value) generated between the input and output elements of the torque converter 1.

The target slip speed control executed at the step S520 employs the PI control (proportional-plus-integral control) which uses the following equations.

$$e(t)=S_O(t)-S_L(t) \qquad (1)$$

$$u(t)=K_P \cdot e(t)+(K_I/s) \cdot e(t) \quad (2)$$

where $S_O$ is the target slip speed, $S_L$ is a slip speed, s is a differential operator, $K_P$ is a proportional gain, and $K_I$ is an integral gain.

The slip speed $S_L$ is calculated by subtracting the rotation speed $N_I$ obtained by the impeller rotation speed sensor 19 from the rotation speed $N_T$ obtained by the turbine rotation speed sensor 20 as follows.

$$S_L = N_T - N_I \quad (3)$$

After the implement of the step S520 wherein the target slip speed control is started, the routine returns to the start step. Since the operation mode is now set at MODE=3 as set at the step S519, the routine proceeds to a step S522 wherein the transmission controller 200 decides whether or not the slip rotation speed $S_L$ is smaller than a second predetermined slip rotation speed $S_{(INH2)}$. That is, at the step S522, the abnormal slip generated during the target slip speed control is checked. When the decision at the step S522 is YES, that is, when it is decided at the step S522 that the abnormal slip is not generated, the routine proceeds to a step S523. When the decision at the step S522 is NO, that is, when it is decided at the step S522 that the abnormal slip is generated, the routine proceeds to a step S528.

At the step S528, the transmission controller 200 executes a counter process against the abnormal slip, such as stopping the target slip speed control.

Following to the implement of the step S528, the routine proceeds to the step S529 wherein the coast lockup control is initialized.

Then, the routine proceeds to a step S530 wherein the operation mode is set at MODE=0 and the routine returns to the start step.

Following to the YES decision at the step S523, the routine proceeds to the step S524 wherein the transmission controller 200 detects the target slip generated between the input and output elements of the torque converter 1. That is, at the step S524 the transmission controller 200 decides whether or not the learning condition is satisfied. The detection condition of the target slip is not limited to a manner of correspondence with the target slip speed $S_O$ and may be decided whether the slip rotation speed $S_L$ is hold to be smaller than the target slip rotation speed $S_O$ for a predetermined time period. When this detection condition is satisfied, that is, when the decision at the step S524 is YES, the routine proceeds to a step S525. When the detection condition is not satisfied, that is, when the decision at the step S524 is NO, the routine jumps to the return step.

At the step S525, the transmission controller 200 sets the operation mode at MODE=4.

At a step S526, the transmission controller 200 updates the learning value, that is, the last stored slip start capacity is updated by the newly detected slip start capacity $P_{L/S(new)}$ in the present routine.

At a step S527, the transmission controller 200 increases the newly detected lockup start capacity $P_{L/S(new)}$ by a predetermined capacity α. That is, a minimum lockup engagement capacity $P_{L/UC(min)}$, at which no slip between the input and output elements of the torque converter 1 is not generated, is obtained. Therefore, during the coast running condition of the vehicle, the vehicle is driven under the minimum lockup condition by means of the coast lockup control.

Figure 7:
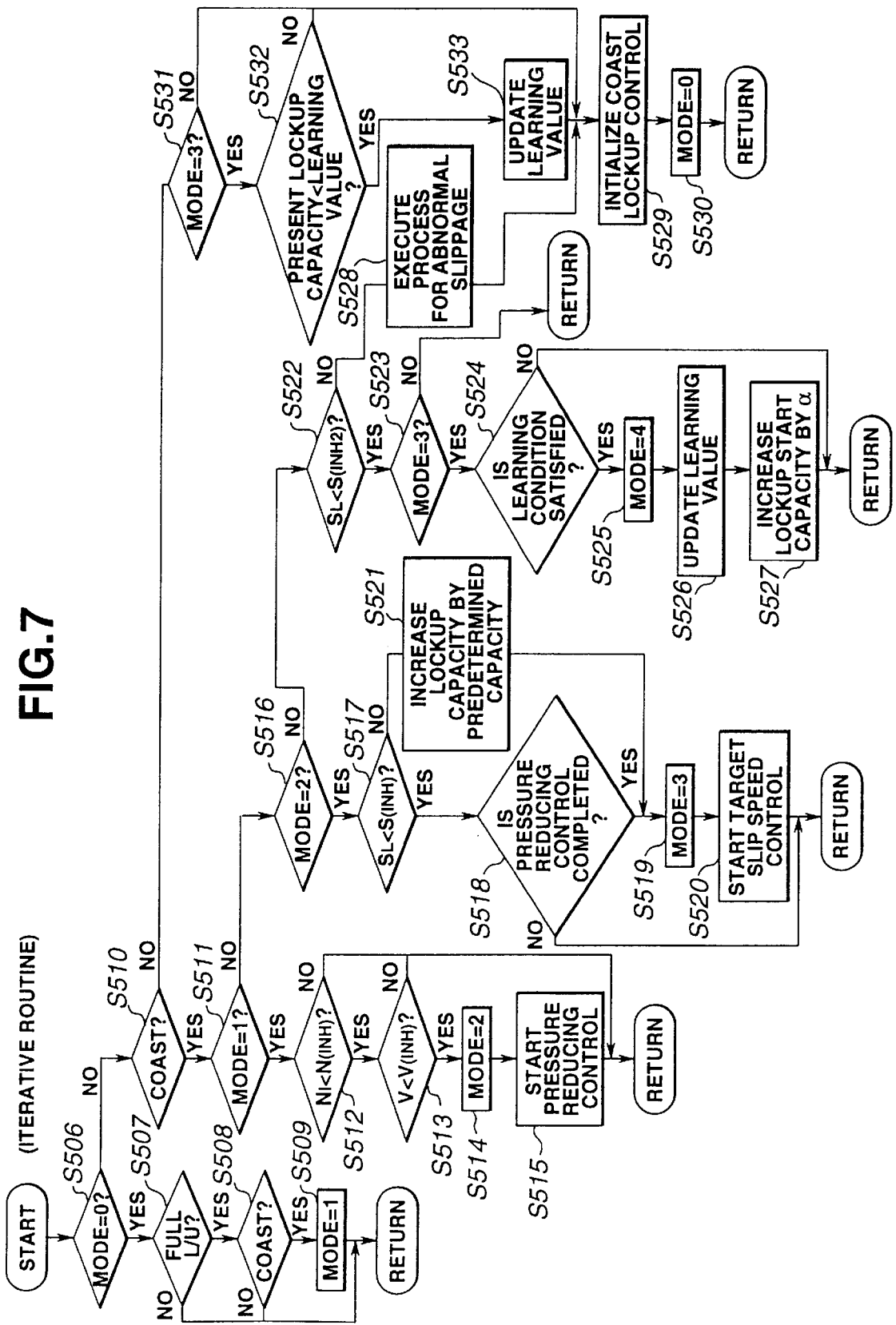
FIG. 7 is a flowchart showing a coast lockup control executed by the lockup control apparatus of a second embodiment according to the present invention.

Referring to FIG. 7, there is shown a second embodiment of the lockup control apparatus of the torque converter 1 according to the present invention. The second embodiment is further arranged to initially store an initial value of the slip start capacity. This arrangement functions to prevent the slip start capacity from becoming indefinite when the vehicle is delivered from a factory to a consumer or when the transmission controller 200 is turned off by some troubles such as disconnection of a battery with the controller 200. The construction of the second embodiment of the lockup control apparatus is the same as that of the first embodiment shown in FIGS. 1 to 3, and only the program shown by the flowchart of FIG. 7 is different from that of FIG. 6. Herein only particular steps S531 to S533 of the flowchart of FIG. 7 will be discussed.

The initial value of the slip start capacity is set at a large value upon taking account of the dispersion of the friction coefficient μ of a facing of the lockup clutch among individuals. If the coast running of the vehicle is completed within a short time period, the delay of the lockup due to the largely set initial value is generated so as to disable the learning of a new slip start capacity.

Therefore, the second embodiment is arranged to execute the steps S531 to S533 between the steps S510 and S529 of FIG. 6, as shown in FIG. 7. These newly added steps S531 to S533 solve the above-mentioned problem. That is, when the transmission controller 200 detects the new slip start capacity, if the coast running is completed while the lockup capacity is smaller than the last stored slip start capacity, the last stored slip start capacity is updated by the lockup capacity at the time of the end of the coast running as a new slip start capacity.

More particularly, when the coast lockup control is cancelled during the target slip rotation speed control according to the decision that the coast running is completed, the transmission controller 200 implements the steps S531 to S533.

At the step S531 following to the NO decision at the step S510, the transmission controller 200 decides whether or not the operation mode is set at MODE=3. When the decision at the step S531 is YES, the routine proceeds to the step S532. When the decision at the step S531 is NO, the routine jumps to the step S529.

At the step S532, the transmission controller 200 decides whether or not the present lockup capacity is smaller than the learning value (the last stored value). When the decision at the step S532 is YES, the routine proceeds to the step S533 wherein the present lockup capacity is stored as the new slip start capacity (the learning value).

Following to the implement of the step S533, the routine proceeds to the step S529 wherein the coast lockup control is initialized.

Then, the routine proceeds to a step S530 wherein the operation mode is set at MODE=0 and the routine returns to the start step.

Figure 8:
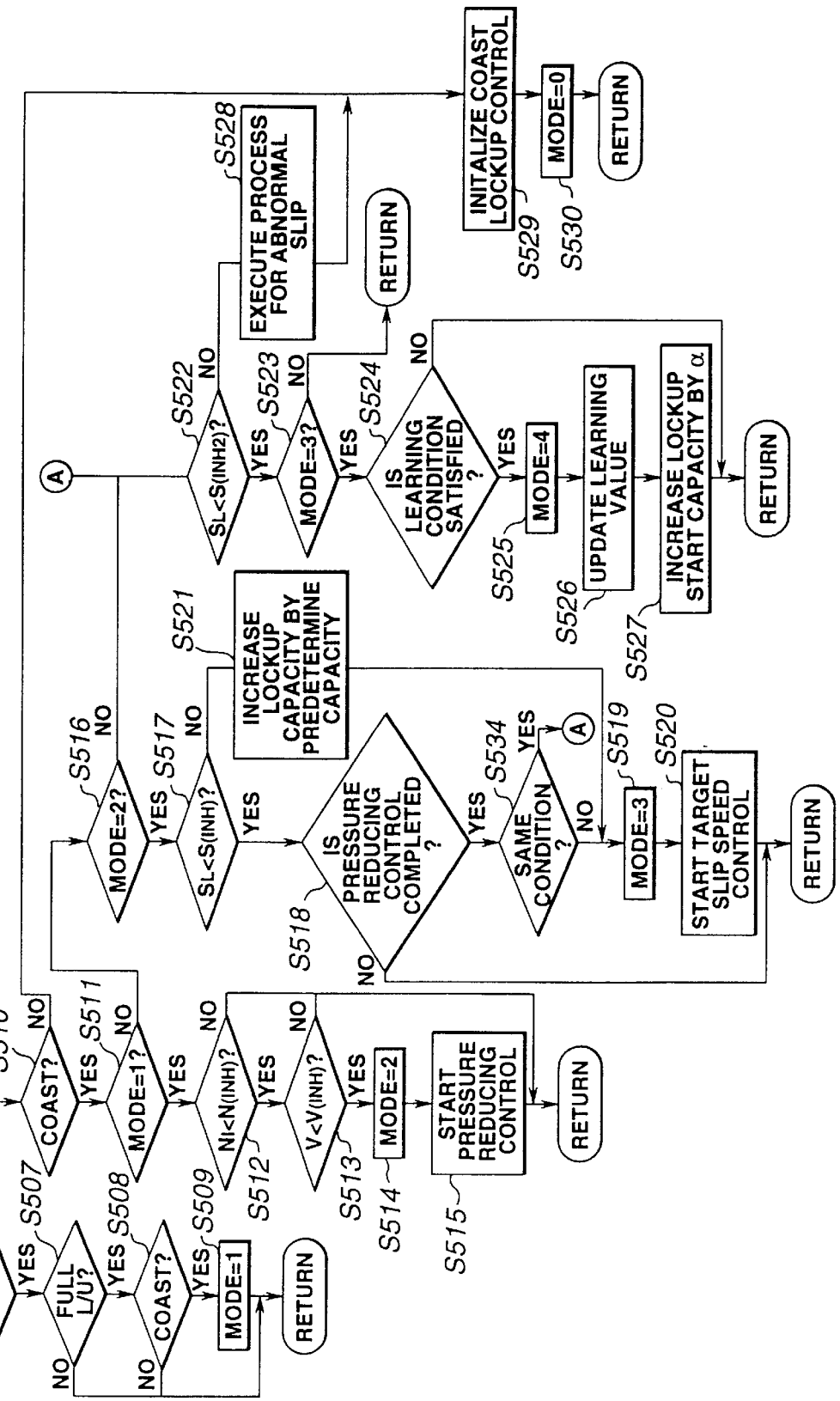
FIG. 8 is a flowchart showing a coast lockup control executed by the lockup control apparatus of a third embodiment according to the present invention.

Referring to FIG. 8, there is shown a third embodiment of the lockup control apparatus according to the present invention. The third embodiment is arranged to prevent unnecessary abrasion of the facing of the lockup clutch 2 since a new minimum lockup engagement capacity is obtained by slightly slipping the lockup clutch 2. The construction of the second embodiment of the lockup control apparatus is the same as that of the first embodiment shown in FIGS. 1 to 3, and only the program shown by the flowchart of FIG. 8 is different from that of FIG. 6. Herein only a particular step S534 of the flowchart of FIG. 8 will be discussed.

The third embodiment is arranged to execute the step S534 between the steps S518 and S519 of FIG. 6. By this arrangement, when the present condition as to the operational circumstance is generally similar to the last condition, the last stored slip start capacity is used as a new slip start capacity. That is, when it is decided at the step S518 that the pressure reducing control is completed, the routine proceeds to the step S534 wherein the transmission controller 200 checks the operational circumstance such as the vehicle speed, V, the temperature of the transmission hydraulic and the like. The transmission controller 200 decides whether or not the change of the present condition with respect to the last condition is smaller than a predetermined value. When the decision at the step S534 is YES, that is, when it is decided that the present condition is as same as the last condition, the routine jumps to the step S522 as shown in FIG. 8. More particularly, the operation mode is held at MODE=2, and the target slip rotation speed control is not executed. At the step S522, the engagement capacity $P_{L/O}$, to which the pressure reducing control has been applied, is maintained at the last minimum lockup engagement capacity. This arrangement enables the cancellation of the detection of the new slip start capacity by each coast running. This suppresses the change of the facing of the lockup clutch 2 due to the aging.

When the decision at the step S534 is NO, the routine proceeds to the step S519 wherein the operation mode is set at MODE=3. Then, the routine proceeds to the step S520 wherein the target slip speed control is started.

Figure 9:
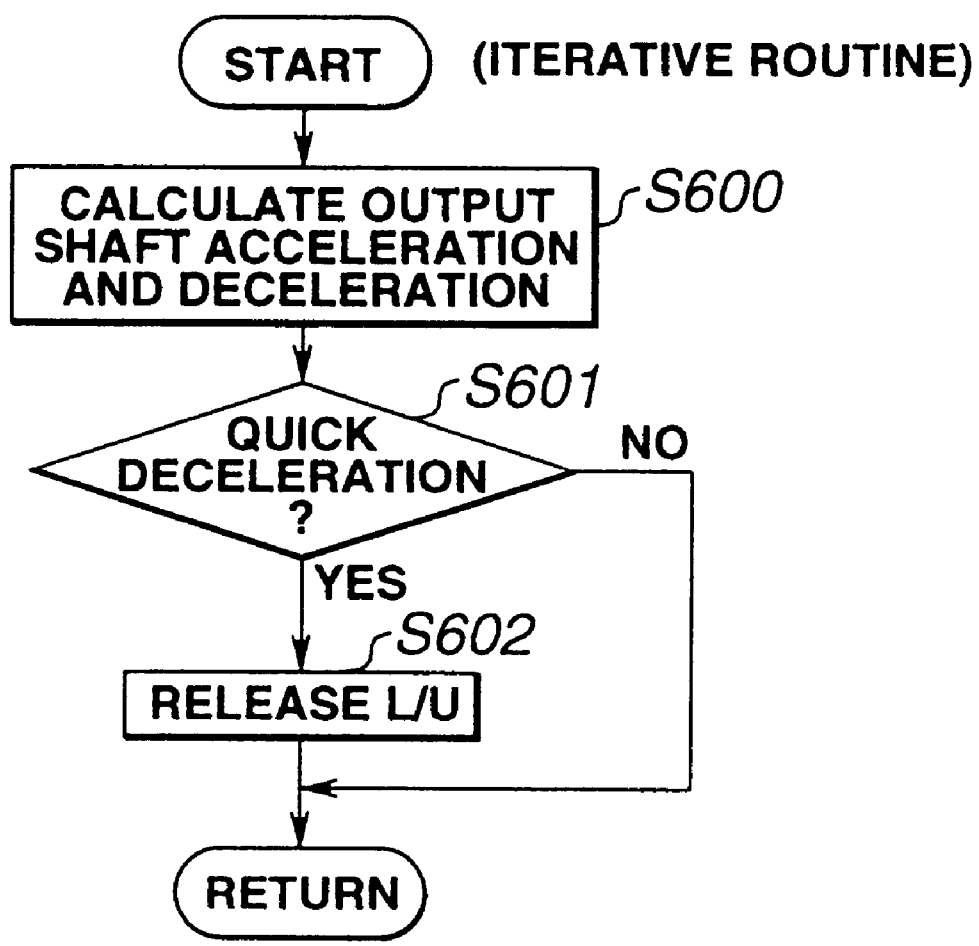
FIG. 9 is a flowchart showing a lockup control executed by the lockup control apparatus of a fourth embodiment according to the present invention.

Referring to FIG. 9, there is shown a fourth embodiment of the lockup control apparatus according to the present invention. The construction of the fourth embodiment of the lockup control apparatus is the same as that of the first embodiment shown in FIGS. 1 to 3, and is further arranged to executed the lockup control shown by a flowchart of FIG. 9.

If a coast running vehicle on a low-friction road is quickly decelerated, the wheel of the vehicle is locked and therefore the stall of the engine is occurred. In order to prevent such engine stall, the fourth embodiment is arranged such that the power transmission between the automatic transmission 4 and the engine 3 is not executed when the vehicle is quickly decelerated. More particularly, the direct connection between the input and output elements of the torque converter 1 is cancelled by releasing the minimum lockup engagement when the vehicle is quickly decelerated.

The manner of operation of the lockup release control for preventing the engine stall will be discussed hereinafter with reference to the flowchart of FIG. 9. The flowchart of FIG. 9 is periodically or non-periodically executed at extremely short intervals.

At a step S600, the transmission controller 200 detects the rotation speed $N_O$ of the transmission output shaft 5 at predetermined intervals. Further, the transmission controller 200 calculates deceleration of the vehicle on the basis of the change of the detected output-shaft rotation speed $N_O$.

At a step S601, the transmission controller 200 decides whether or not the vehicle is quickly decelerated by comparing the calculated deceleration with a threshold value. When the decision at the step S601 is YES, the routine proceeds to a step S602. When the decision at the step S601 is NO, the routine jumps to a return step from which the routine returns to a start step thereof.

At the step S602, the transmission controller 200 releases the minimum lockup engagement of the torque converter 1. That is, the wheel lock generated by the quick deceleration of the vehicle is avoided by releasing the lockup engagement of the torque converter 1. Therefore, it is possible to prevent the engine stall during the coast running.

With this arrangement, it is possible to avoid the generation of abnormal slip by setting the minimum lockup engagement capacity including a preferable margin. Such margin corresponds to decreasing the decreased amount of the lockup capacity in the pressure reducing control and by increasing the predetermined capacity a applied to the slip start capacity. This improves the performance and reliability of the lockup release control executed by the lockup control apparatus of the fourth embodiment.

Figure 10:
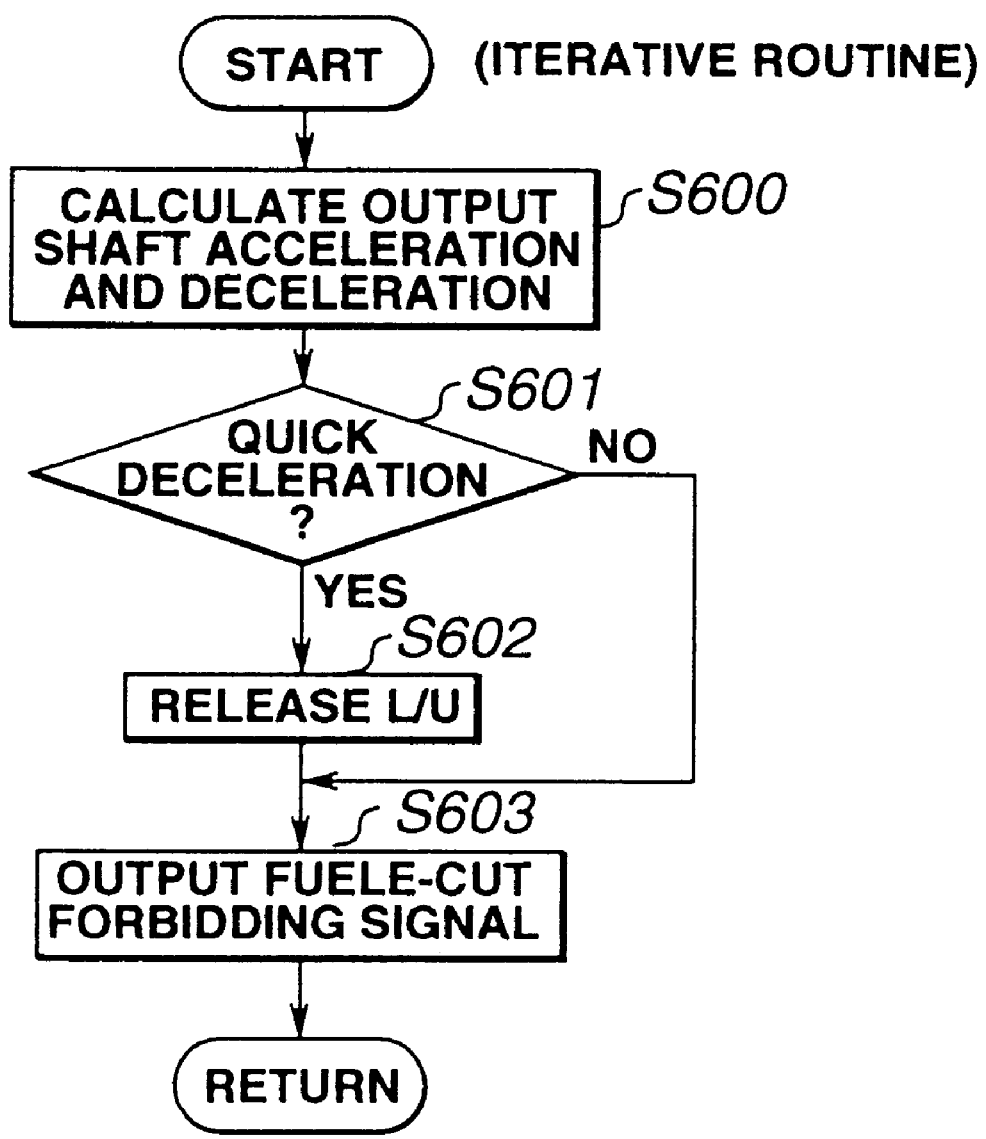
FIG. 10 is a flowchart showing a lockup control executed by the lockup control apparatus of a fifth embodiment according to the present invention.

Referring to FIG. 10, there is shown a fifth embodiment of the lockup control apparatus according to the present invention. The construction of the fifth embodiment of the lockup control apparatus is the same as that of the first embodiment shown in FIGS. 1 to 3, and is further arranged to executed the lockup control shown by a flowchart of FIG. 10 instead of the flowchart of FIG. 9. The flowchart of FIG. 10 is periodically or non-periodically executed at extremely short intervals.

The lockup control apparatus of the fifth embodiment is arranged to prevent the engine stall caused by the quick deceleration under the coast running. This arrangement is ensured by adding a step S603 following to the step S602 of the flowchart of FIG. 9 as shown in FIG. 10 so as to execute the engine stall preventing control of the engine 3.

When the transmission controller 200 decides that the vehicle is quickly decelerated, the minimum lockup engagement is cancelled at the step S602.

Then, the routine proceeds to the step S603 wherein the transmission controller 200 stops the fuel-cut control by outputting the fuel-cut prohibiting signal to the engine 3. This improves the engine stall preventing effect. By this prohibition of the fuel-cut control, the margin of the minimum lockup engagement capacity is further increased and therefore the performance and reliability of the lockup control is further improved.

Although in this fifth embodiment the fuel-cut prohibiting control during the coast running is executed by outputting the quick deceleration signal from the transmission controller 200 to the engine controller 100, it will be understood that the engine 3 may be directly controlled by the transmission controller 200.

Figure 11:
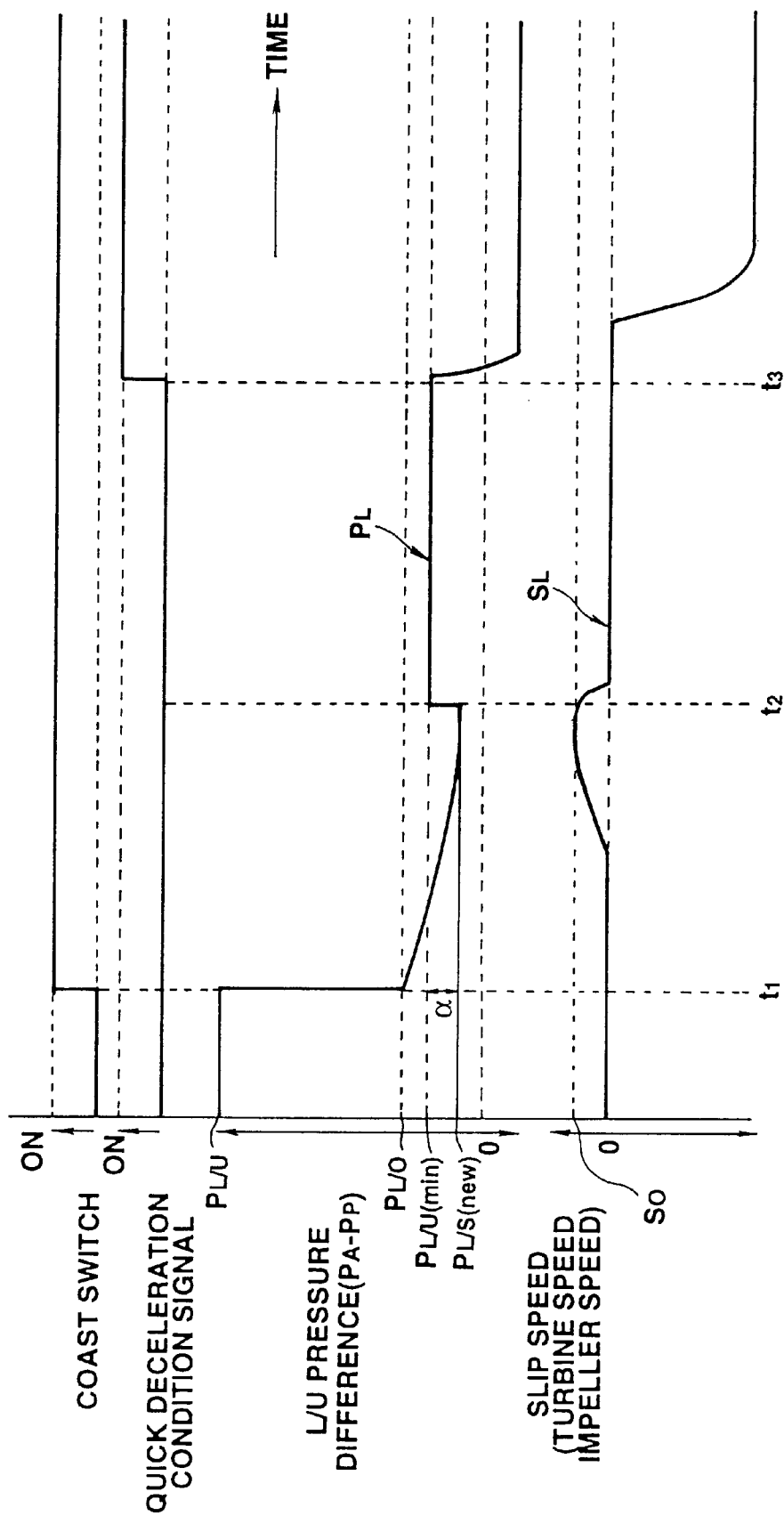
FIG. 11 is a time chart showing a lockup capacity control during the coast running in accordance with the present invention.

FIG. 11 shows time charts of the lockup capacity control during the coast running in accordance with the present invention. These time charts represent the changes of the coast switch signal, the quick deceleration condition signal, the lockup capacity $P_L$ $(=P_A-P_R)$ and the slip rotation speed $S_L$ $(=N_T-N_I)$.

When the coast switch 13 is turned ON by releasing the acceleration pedal 7 at a time moment $t_1$ under the full lockup condition during the vehicle traveling condition, the lockup engagement capacity $P_{L/U}$ is once decreased to the engagement capacity $P_{L/O}$, which is the sum of the last stored slip start capacity $P_{L/S(old)}$ (not shown) and the preset capacity $\Delta P$, in order to start the target slip speed control for obtaining a slight target slip.

When the new slip start capacity $P_{L/S(new)}$ is detected by the target slip speed control, the new slip start capacity $P_{L/S(new)}$ is increased by the predetermined capacity α at the time moment $t_2$. The sum of the new slip start capacity $P_{L/S(new)}$ and the predetermined capacity α is determined as the minimum lockup engagement capacity $P_{L/U(min)}$.

That is, the new slip start capacity $P_{L/S(new)}$ is obtained by generating a slight slip between the input and output elements of the torque converter 1 during the coast running, and the new minimum lockup engagement capacity $P_{L/U(min)}$ is obtained on the basis of the new slip start capacity $P_{L/S(new)}$. Therefore, even if the friction coefficient of the facing of the lockup clutch 2 is dispersed among individuals, it is possible to establish the minimum lockup engagement and to prevent the response delay of the lockup clutch 2 and the coast running under the lockup engagement cancelled condition. Accordingly, even if the friction coefficient at the facing of the lockup clutch 2 is dispersed among individuals, the minimum lockup engagement is compensated by this arrangement according to the present invention to ensure the effective power transmission.

Further, when the quick deceleration condition signal is turned ON according to the quick braking executed by the driver, the lockup engagement is cancelled by decreasing the minimum lockup engagement capacity $P_{L/U(min)}$. This functions to prevent the engine stall due to the wheel lock and the like. Simultaneously, the fuel-cut prohibiting signal is outputted to the engine 3 to stop the fuel cut during the coast running. Under the running condition that the quick deceleration condition signal is not outputted, the timing for canceling the lockup engagement is determined on the basis of the normal lockup cancel condition such as the vehicle speed signal.

Figure 12:
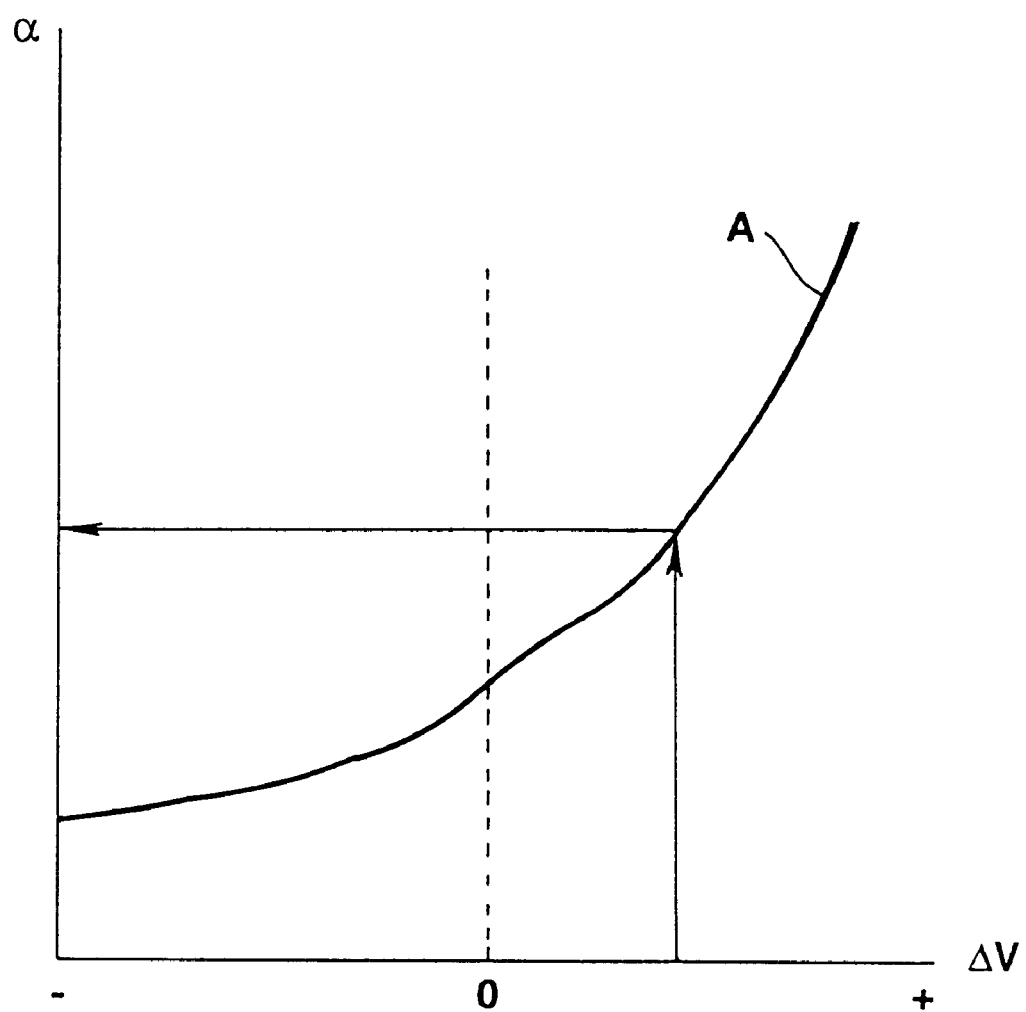
FIG. 12 is a graph showing a relationship between a predetermined capacity $\alpha$ and a change amount $\Delta V$ of the vehicle speed employed in the present invention.
Figure 13:
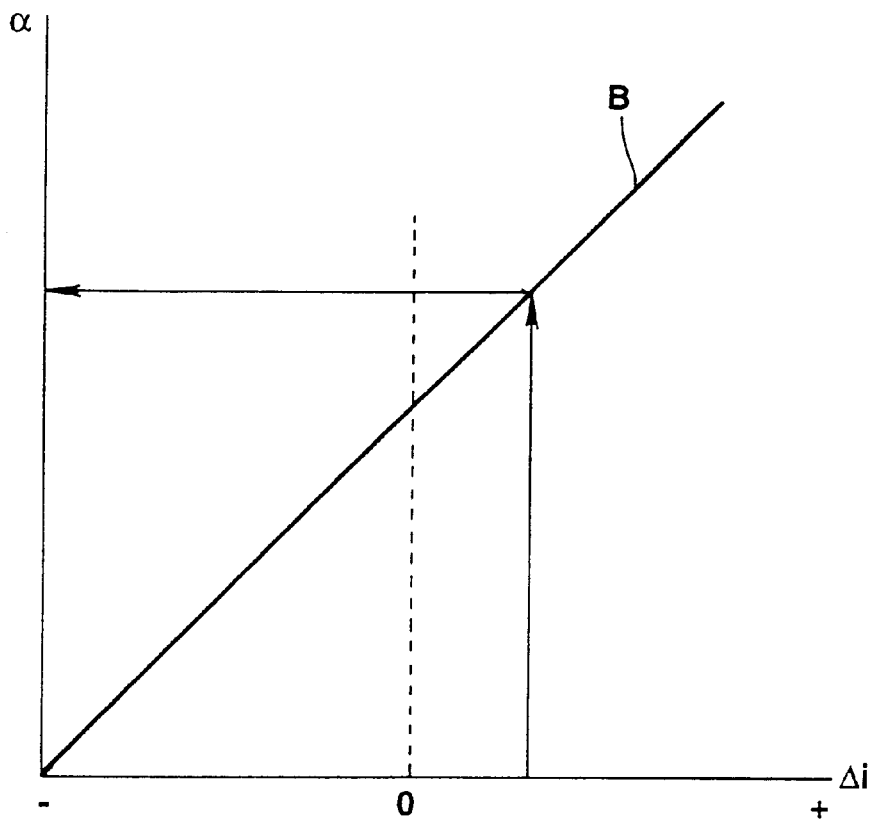
FIG. 13 is a graph showing a relationship between the predetermined capacity $\alpha$ and a change amount $\Delta i$ of the gear ratio employed in the present invention.
Figure 14:
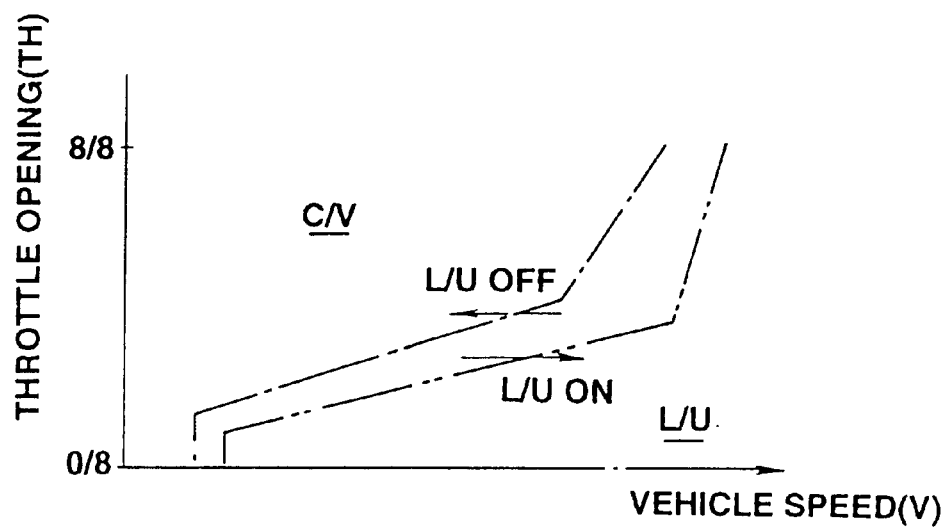
FIG. 14 is a graph showing a lockup range of an automatic transmission employing the lockup control apparatus according to the present invention.

Although the predetermined capacity α added to the new slip start capacity $P_{L/S(new)}$ may be previously defined as a constant value, it is preferable that the predetermined capacity α is changed on the basis of vehicle circumstance. FIGS. 12 and 13 show maps for determining the predetermined capacity α. In FIG. 12, the horizontal axis represents the change amount ΔV of the vehicle speed V, and the vertical axis represents the predetermined capacity α. In FIG. 13, the horizontal axis represents the change amount Δi of the gear ratio, and the vertical axis represents the predetermined capacity α.

The transferred power (coast torque) of the torque converter 1 through the lockup clutch 2 is increased according to the increase of the vehicle speed V. Therefore, it is necessary to increase the predetermined capacity α according to the increase of the vehicle speed V. In reverse, when the vehicle speed V is small, the predetermined capacity α may be decreased.

The transmission controller 200 calculates a difference ΔV between the present vehicle speed $V_{(new)}$ at the time when the present slip start capacity is detected and the last vehicle speed $V_{(old)}$ at the time when the last slip start capacity was detected. Further, on the basis of the detected difference ΔV and a curve A of FIG. 12, the transmission controller 200 obtains the predetermined capacity α according to the change amount ΔV of the vehicle speed.

Similarly, the coast torque is increased according to the increase of the gear ratio i such as a downshift from the fourth speed to the third speed. Therefore, it is necessary to increase the predetermined capacity α according to the increase of the gear ratio i. In reverse, when the gear ratio i is small, the predetermined capacity α may be decreased.

The transmission controller 200 calculates a difference Δi between the present gear ratio $i_{(new)}$ at the time when the present slip start capacity is detected and the last gear ratio $i_{(old)}$ at the time when the last slip start capacity was detected. Further, on the basis of the detected difference Δi and a curve B of FIG. 13, the transmission controller 200 obtains the predetermined capacity α according to the change amount Δi of the gear ratio.

By arranging such that the predetermined capacity α is determined according to the change amount of the vehicle speed V or gear ratio i, the minimum lockup engagement capacity is adjusted at a preferable value upon taking account of the transfer torque between the input and output elements of the torque converter 1. This provides a proper lockup engagement force to the torque converter 1.

Although the preferred embodiments have been shown and described such that the fuel cut control is executed as to the engine 3, it will be understood that the fuel cut control may not be executed as to the engine 3. Further, the automatic transmission 4 may be limited to a plural-speed automatic transmission and may be a continuously variable transmission such as a V-belt type continuously variable transmission and a toroidal type continuously variable transmission.

What is claimed is:

1. A lockup control apparatus of a torque converter, the lockup control apparatus comprising:

a coast running detector detecting coast running of a vehicle equipped with the torque converter;

a lockup capacity detector detecting a lockup capacity according to which a lockup engagement condition of torque converter is controlled;

a slip detector detecting a magnitude of slip between the input and output elements of the torque converter; and a controller determining a slip start capacity at which a target slip is generated between the input of the torque converter on the basis of the detected lockup capacity and the detected slip when the coast running is detected, said controller calculating a minimum lockup engagement capacity on the basis of the slip start capacity under the coast running, said controller controlling the lockup capacity at the minimum lockup engagement capacity.

2. A lockup control apparatus as claimed in claim 1, wherein the slip start capacity is obtained by decreasing the lockup capacity to a last detected slip start capacity.

3. A lockup control apparatus as claimed in claim 1, wherein the minimum lockup engagement capacity is obtained by increasing a newly detected slip start capacity by a predetermined capacity.

4. A lockup control apparatus as claimed in claim 1, wherein the lockup capacity at the end time of the coast running is treated as a new slip start capacity when the coast running is finished such that the lockup capacity was still smaller than the last stored slip start capacity before the detection of the target slip.

5. A lockup control apparatus as claimed in claim 1, wherein when said controller decides that an operational circumstance of the torque converter is the same as that of a last control, a last stored slip start capacity is used as a new slip start capacity.

6. A lockup control apparatus as claimed in claim 1, wherein when the vehicle is quickly decelerated, the lockup engagement is released.

7. A lockup control apparatus as claimed in claim 6, wherein when the vehicle is quickly decelerated, the engine stall preventing control is executed.

8. A lockup control apparatus as claimed in claim 3, wherein the predetermined capacity added to the slip start capacity is determined on the basis of at least one of the vehicle speed and the gear ratio.

9. A lockup control apparatus of a lockup type torque converter, the lockup control apparatus comprising:

a coast condition detecting means for detecting a coast running condition of a vehicle equipped with the lockup type torque converter;

a clutch slip detecting means for detecting a target slip generated between input and output elements of the torque converter;

a lockup capacity detecting means for detecting a lockup capacity according to which an engagement condition between input and output elements of the lockup type torque converter is controlled;

a slip start capacity storing means for detecting a slip start capacity at which a target slip is generated and for storing the slip start capacity while updating the slip start capacity; and a coast lockup controlling means for controlling the minimum lockup engagement capacity on the basis of the stored slip start capacity which is obtained by once decreasing the lockup capacity to an engagement capacity which is the sum of the last stored slip start capacity and a preset capacity by means of said coast condition detecting means and said slip start capacity storing means.

10. A lockup control apparatus of a torque converter comprising:

a lockup clutch directly connecting input and output elements of the torque converter;

an operating condition detecting unit detecting an operating condition of the torque converter and an operating condition of an engine connected to the torque converter;

a valve unit applying a plurality of hydraulic pressures to said lockup clutch;

a controller controlling said lockup clutch according to the operating conditions of the torque converter and the engine, said controller deciding on the basis of signals from said operating condition detecting unit whether a vehicle equipped with the torque converter is put in a coast running condition, said controller deciding from the signals of said operating condition detecting unit whether a target slip is generated between the input and output elements of the torque converter, said controller detecting a slip start capacity at which the target slip is generated and for storing the slip start capacity while updating the slip start capacity, said controller controlling the minimum lockup engagement capacity on the basis of the updated slip start capacity.

11. A lockup control apparatus as claimed in claim 10, wherein said operating condition detecting unit comprises a coast switch which outputs an ON signal when the vehicle is put in the coast running condition.

12. A lockup control apparatus as claimed in claim 10, wherein the updated slip start capacity is obtained by once decreasing the lockup capacity to an engagement capacity which is the sum of the last stored slip start capacity and a preset capacity.

* * * * *